A. A. KENT.
VEHICLE SEAT.
APPLICATION FILED DEC. 29, 1920.
1,417,744.
Patented May 30, 1922.
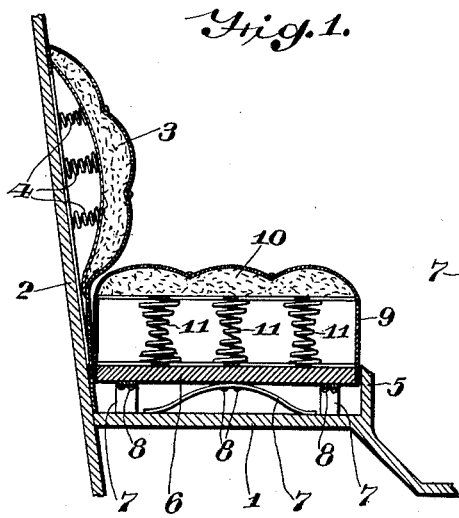
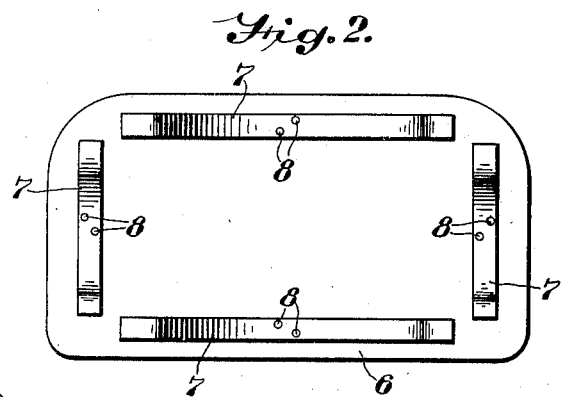
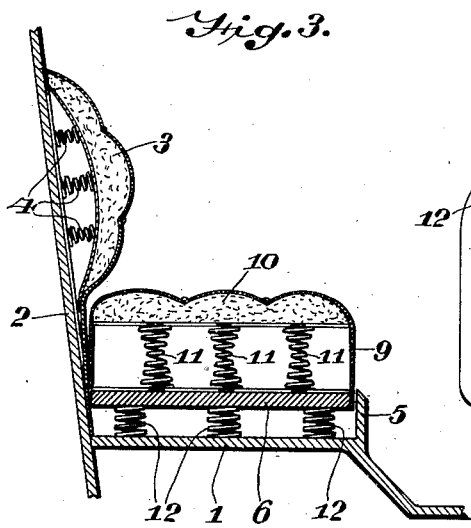
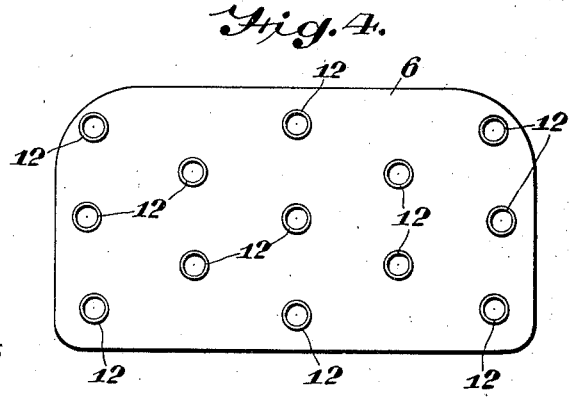
INVENTOR.
Arthur Atwater Kent
BY Cornelius L. Ehret
his ATTORNEY.

UNITED STATES PATENT OFFICE.

ARTHUR ATWATER KENT, OF ARDMORE, PENNSYLVANIA.

VEHICLE SEAT.

1,417,744.  Specification of Letters Patent.  Patented May 30, 1922.

Application filed December 29, 1920. Serial No. 433,807.

*To all whom it may concern:*

Be it known that I, ARTHUR ATWATER KENT, a citizen of the United States, residing in Ardmore, county of Montgomery, and State of Pennsylvania, have invented certain new and useful Improvements in Vehicle Seats, of which the following is a specification.

My invention relates to seats for moving vehicles, and particularly motor vehicles, and such as traverse roads which are more or less uneven or rough.

It is the object of my invention to provide seat structure for a vehicle of the character referred to which shall reduce the jolting to which the seat occupant is subjected by reducing the amplitude of movement partaken of by the seat structure.

To these ends I provide means for materially increasing the weight and inertia of the seat, as by interposing between the seat proper and the seat support an inertia imparting weight or weighted member between which and the support intervenes suitable resilient or yielding supporting means, whereby the total weight of occupant, seat and weight is so materially increased that the jolting imparted to and the amplitude of movement of the occupant is materially reduced to increase comfort of riding.

For an illustration of some of many forms my invention may take, reference may be had to the accompanying drawing, in which:

Fig. 1 is a vertical sectional view through structure embodying my invention.

Fig. 2 is a bottom plan view of the weight and spring support therefor.

Fig. 3 is a vertical sectional view through a modified structure.

Fig. 4 is a bottom plan view of the weight and resilient supporting means of Fig. 3.

Referring to the drawing, 1 is the seat support carried by or in any suitable way secured to the vehicle, as an automobile or other road vehicle. Disposed between the back member 2, which may be, if desired, provided with suitable upholstering 3 and springs 4, and an upstanding member 5 on the support 1, is disposed the substantially horizontal inertia-imparting weight or weighted member 6 resting upon leaf or bow springs 7 which, in the example illustrated, may be secured to the member 6 by screws or other fastening means 8.

The weight or weighted member 6 may be of cast or sheet metal, or any other suitable weight or inertia-imparting material.

The weight for each person may be of the order of one hundred pounds, for example, though it will be understood that my invention comprehends other magnitudes, so long as they are suitably large in comparison to the weight of occupant and seat imparted by the member 6.

In the example illustrated, the structure may be that of the rear seat of an automobile and of a width to accommodate several persons, though it will be understood that my invention is applicable also to single seats.

Resting upon or carried by the weight member 6 is any usual or suitable seat 9, which may be provided with the usual upholstering 10 and springs 11.

In Figs. 3 and 4 the structure is the same in principle as that illustrated in Fig. 1; in lieu of the leaf or bow spring 7, however, there are employed helical springs 12, of any suitable number, spaced in any suitable manner.

The springs 7 of Fig. 1 and the springs 12 of Fig. 3 are preferably suitably weak or easily flexed, and spring structure which is too stiff or rigid is to be avoided.

In operation, as the vehicle moves over a rough road, when the vehicle body and the support 1 suddenly rise, the springs 7 or 12 will quickly and promptly yield, due to the great weight or inertia of the weight member 6 in addition to the seat 9 and the occupant or occupants, so reducing the amplitude of movement of the occupant and in effect reducing the jarring or jolting and increasing the comfort of the rider.

The seat springs 11 as usual also deflect or yield, but their extent of yielding or deflection is lessened by the presence of the inertia member 6.

While the occupant might sit directly upon the member 6, it is preferred that the usual spring and upholstery seat be provided as affording additional comfort.

What I claim is:

1. Seat structure for moving vehicles comprising a support, an inertia-imparting weight structure spaced therefrom and movable with respect thereto, and resilient means opposing relative movement of said weight structure and said support, whereby movement is retarded and its amplitude restricted.

2. Seat structure for moving vehicles comprising a support, an inertia-imparting weight structure spaced therefrom and movable with respect thereto, and a plurality of springs intervening between said weight structure and said support for opposing their movement relative to each other, whereby movement is retarded and its amplitude restricted.

3. Seat structure for moving vehicles comprising a support, a seat, a heavy inertia-imparting plate carying said seat and movable with respect to said support, and resilient means intervening between said support and said plate, whereby movement of said seat is retarded and its amplitude restricted.

4. Seat structure for moving vehicles comprising a support, an inertia-imparting weight structure spaced therefrom and movable with respect thereto, resilient means opposing relative movement of said weight structure and said support, and a yielding seat carried by said weight structure, whereby movement of said seat is retarded and its amplitude restricted.

5. Seat structure for moving vehicles comprising a support, an inertia-imparting weight structure spaced therefrom and movable with respect thereto, a plurality of springs intervening between said weight structure and said support for opposing their movement relative to each other, and a yielding seat carried by said weight structure, whereby movement of said seat is retarded and its amplitude restricted.

In testimony whereof I have hereunto affixed my signature this 24th day of December, 1920.

ARTHUR ATWATER KENT.